United States Patent
Orwick et al.

(10) Patent No.: US 6,201,856 B1
(45) Date of Patent: Mar. 13, 2001

(54) EMERGENCY TELEPHONE CALL NOTIFICATION SERVICE SYSTEM AND METHOD

(75) Inventors: David Anthony Orwick; Karen Jeanne Pelletier, both of Crystal Lake; Laura Marie Griffith, Dundee, all of IL (US); Todd August Bartels, New Berlin, WI (US); Thomas Joseph McBlain, Arlington Heights, IL (US); Dianna Inara Tiliks, Elk Grove, IL (US); Gordon Lynn Blumenschein, Woodridge, IL (US); James Daniel Kovarik, Batavia, IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/211,636

(22) Filed: Dec. 15, 1998

(51) Int. Cl.[7] .................................................. H04M 11/04
(52) U.S. Cl. ................. 379/40; 379/45; 379/41
(58) Field of Search ................. 379/38, 39, 40, 379/45, 41, 42, 43, 44, 46, 47, 48, 49, 50, 243, 177

(56) References Cited

U.S. PATENT DOCUMENTS

| | | |
|---|---|---|
| 3,662,111 | 5/1972 | Rubinstein . |
| 4,371,751 | 2/1983 | Hilligoss, Jr. et al. . |
| 4,417,100 | 11/1983 | Carlson et al. . |
| 4,492,820 | 1/1985 | Kennard et al. . |
| 4,510,350 | 4/1985 | Wagner et al. . |
| 4,743,892 | 5/1988 | Zayle . |
| 5,077,788 | 12/1991 | Cook et al. . |
| 5,128,979 | 7/1992 | Reich et al. . |
| 5,161,180 | 11/1992 | Chavous . |
| 5,166,972 | 11/1992 | Smith . |
| 5,195,126 | 3/1993 | Carrier et al. . |
| 5,315,636 | 5/1994 | Patel . |
| 5,333,173 | 7/1994 | Seazholtz et al. . |
| 5,339,351 | 8/1994 | Hoskinson et al. . |
| 5,598,460 | 1/1997 | Tendler . |
| 5,659,605 | * 8/1997 | Voit et al. ............................. 379/243 |
| 5,761,278 | 6/1998 | Pickett et al. . |
| 5,787,429 | 7/1998 | Nikolin, Jr. . |
| 5,805,670 | 9/1998 | Pons et al. . |

FOREIGN PATENT DOCUMENTS

WO 97/35440  9/1997  (WO) .

* cited by examiner

*Primary Examiner*—Curtis A. Kuntz
*Assistant Examiner*—Melur Ramakrishnaiah
(74) *Attorney, Agent, or Firm*—Brinks Hofer Gilson & Lione

(57) ABSTRACT

A system and method for emergency telephone call notification. The system includes an AIN capable switch, a service control point (SCP) having a database of designated contact numbers associated with a service subscriber telephone number, and an intelligent peripheral (IP) in communication with the SCP for contacting the designated contact numbers. The method includes the steps of recognizing an N11 trigger and the SCP initiating telephone calls, via the IP, to each of the contact numbers corresponding to the telephone number of the subscriber making the emergency telephone call.

18 Claims, 3 Drawing Sheets

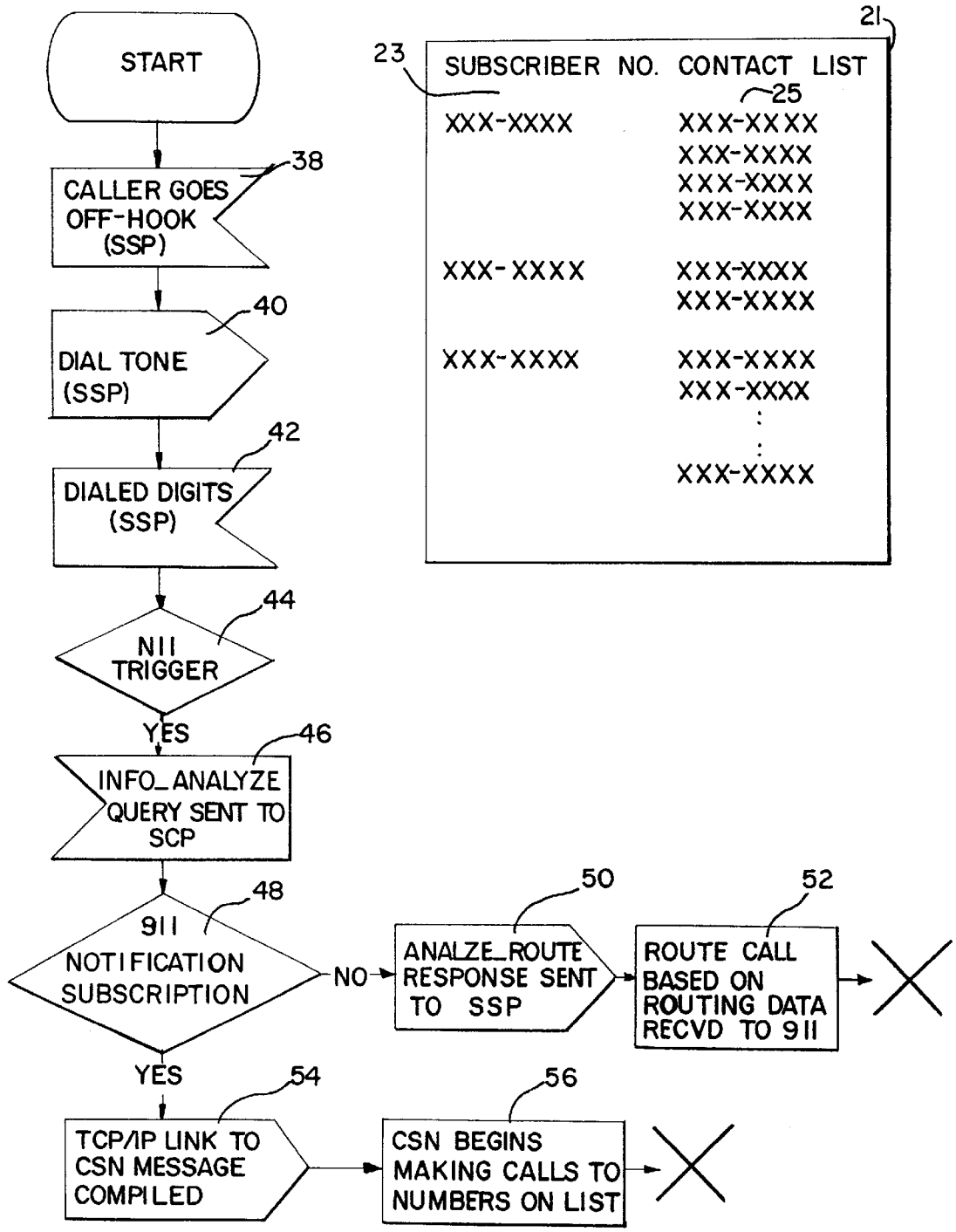

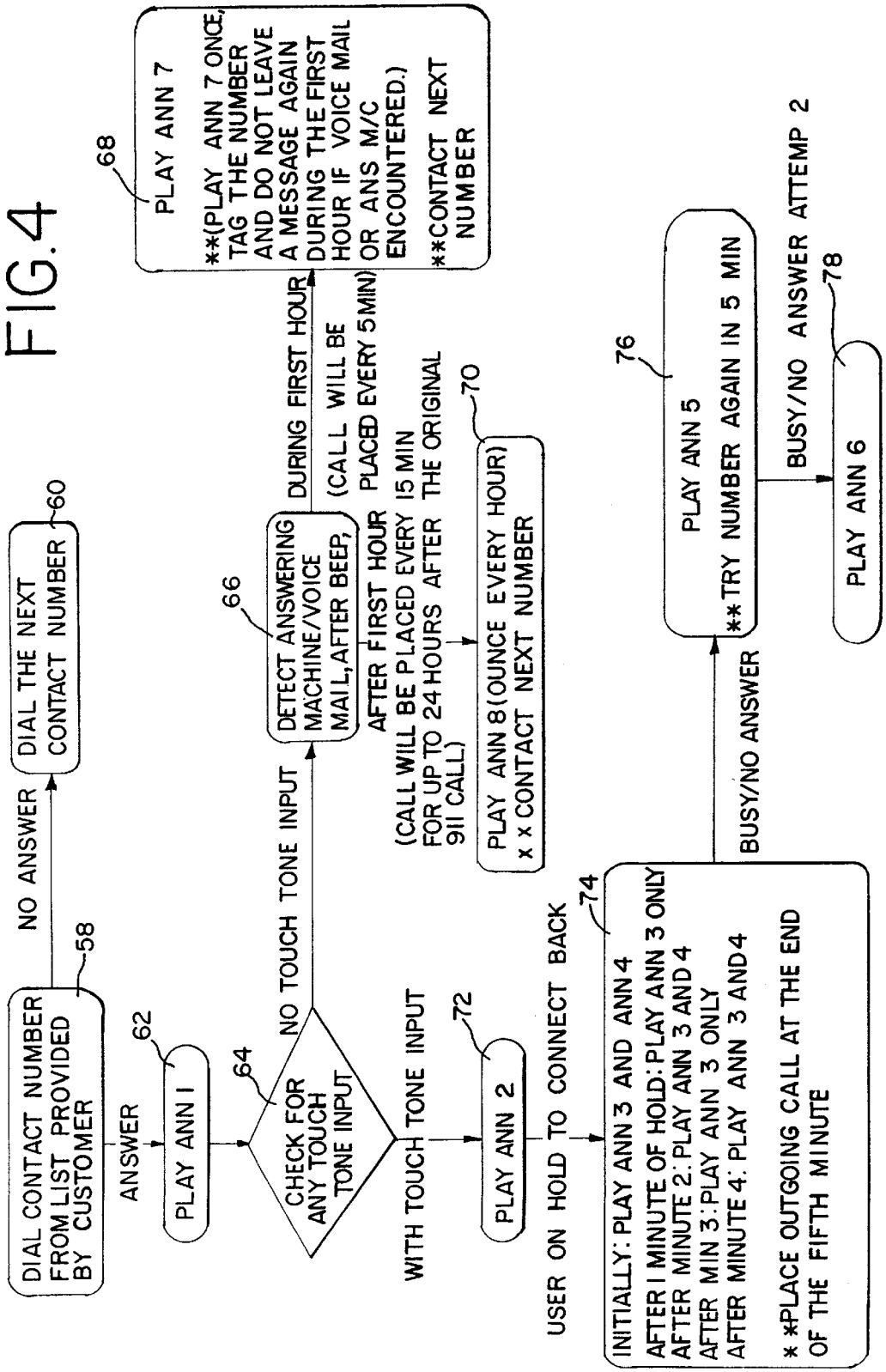

EMERGENCY TELEPHONE CALL NOTIFICATION SERVICE SYSTEM AND METHOD

BACKGROUND OF THE INVENTION

In an emergency situation, people need to quickly contact the appropriate agency (police, fire department, ambulance, poison control, etc.). Many communities provide a single telephone number, such as 911, which connects a caller to a central dispatcher to gather information and relay the call to the appropriate destination. In addition to locating and contacting the appropriate agency, the caller may also wish to notify other parties that an emergency situation exists.

Several systems and methods for providing auxiliary notification have been proposed. One system discloses a transmitting device with a panic button that is worn by a user that, when activated, transmits a signal to a base unit attached to a telephone. The base unit automatically calls a predetermined list of telephone numbers and plays a prerecorded message. Another system discloses attaching an emergency call monitor to a user's telephone. When an emergency call is made, the monitor waits until the call is complete and then automatically dials out to a messaging service that calls predetermined numbers and plays a prerecorded message. In yet another system, emergency call detection equipment is attached to a telephone switch and reacts to 911 telephone calls by activating a calling service to contact a predetermined list of telephone numbers.

One drawback of these emergency telephone call notification systems is the need for specialized equipment in addition to the standard telephone system equipment. Also, many existing notification systems have limited flexibility and only a few basic features.

Accordingly, there is a need for an improved system and method of communicating emergency telephone call notices to designated parties that provides flexible and efficient use of existing infrastructure. BRIEF DESCRIPTION OF THE DRAWINGS FIG. 1 illustrates an emergency telephone call notification system according to a presently preferred embodiment.

FIG. 2 is a diagram illustrating a contact list stored at the SCP show in FIG. 1.

FIG. 3 is a flow chart illustrating a method of providing an emergency telephone call notification service on the system of FIG. 1 according to a presently preferred embodiment.

FIG. 4 is a flow chart illustrating a preferred method of contacting designated contact numbers, the method for use in the system of FIG. 1.

DETAILED DESCRIPTION OF THE PRESENTLY PREFERRED EMBODIMENTS

Figure 1:
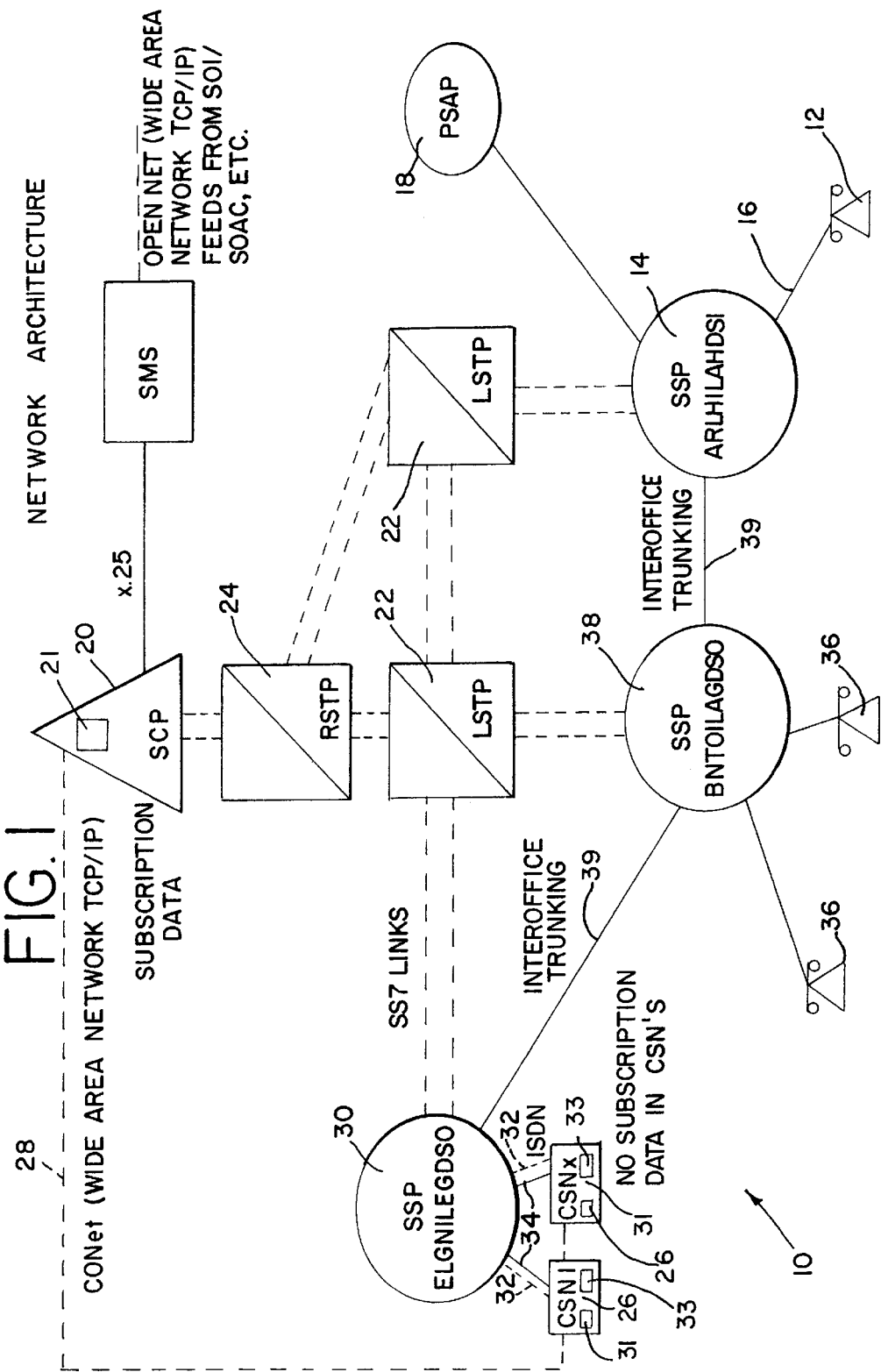

As described in greater detail below, a preferred system and method for providing an emergency telephone call notification service utilizes advanced intelligent network infrastructure to avoid the need to add or maintain additional hardware to support the service. FIG. 1 illustrates a telecommunications system 10 according to a preferred embodiment. The system preferably includes a subscriber telephone 12 in communication with a first advanced intelligent network (AIN) capable service switching point (SSP) 14 over a voice/information line 16. The first SSP 14 is in communication over a voice/information line with a public safety access point (PSAP) 18. The PSAP 18 is preferably an emergency call receiving station having one or more emergency dispatchers to handle and route emergency telephone calls to the appropriate agency. In one embodiment, the PSAP 18 is accessible from the subscriber telephone 12 by dialing a predetermined telephone number such as 911.

The first SSP 14 includes an AIN emergency telephone number trigger recognition capability for recognizing dialed digits of any of a number of emergency telephone numbers. In a preferred embodiment, the first SSP 14 is configured to recognize an N11 trigger when a 911 telephone number is dialed.

The system 10 also includes one or more service control points (SCP) 20. An SCP 20 is an AIN network element containing logic and data necessary to provide functionality required for the execution of a desired communication service. An SCP 20 generally permits separation of service logic from switching functionality such that additional services maybe developed without the need to provision software in each individual SSP. A suitable SCP 20 is the Advantage SCP manufactured by Lucent Technologies. In a preferred embodiment, the SCP 20 includes a designated contact number list 21 (FIG. 2) stored in memory corresponding to each subscriber telephone number that subscribes to the emergency telephone number notification service described below. The contact list 21 includes a list of subscriber telephone numbers 23 and a list of the contact telephone numbers 25 associated with each subscriber telephone number.

Other than specific system memory limitations and telephone company policy, there may be any number of contact numbers per subscriber. In one embodiment, each subscriber is permitted four contact numbers. In another embodiment, a subscriber may be represented by a range of telephone numbers so that each telephone number in the range of numbers is associated with the same set of contact numbers. For example, a subscriber may be a company having a range of consecutive telephone numbers where the same contact numbers are desired for all of the numbers in the range. Additionally, the contact numbers may also be for communication devices or services other than a standard plain old telephone service (POTS) telephone. For example, the contact numbers may be for cellular telephones, paging services, or other communication devices and services.

The SCP 20 communicates with SSP's, such as the first SSP 14, over a data channel via at least one service transfer point (STP). The system 10 may include local STP's (LSTP) 22 and a regional STP (RSTP) 24. The LSTP's 22 and RSTP 24 are connected via data channels and also connect the SCP to the SSP's via data channels. A suitable data signal extended for use with the STPs is the American National Standards Institute (ANSI) signalling system No. 7 (SS7). A suitable SCP/SSP communication protocol is the AIN 0.1 SCP/SSP protocol set forth in Bellcore Technical Reference TR-NWT-001285, entitled AIN Switch-Service Control Point Application Protocol Interface Generic Requirements, Issue 1, August 1992.

The SCP 20 also communicates with one or more compact service nodes (CSN) 26 or other type of service node/intelligent peripheral. In one embodiment, the SCP 20 communicates directly with each CSN 26 over a wide area network (WAN) 28 such as CONet using transfer control protocol/internet protocol (TCP/IP). Other networks capable of running TCP/IP are also suitable for facilitating communication between each CSN and an SCP. In other embodiments, the SCP may communicate with the CSN 26 via one or more STPs and an SSP.

Each CSN 26 is a network element of the AIN that contains resources to exchange information with an end user and perform other functions such as call origination and tone generation. The CSN 26 provides special resources for interactions between the end user and the network such as dual tone multi-frequency (DTMF) recognition, playing pre-recorded announcements and tone generation. A service node/intelligent peripheral platform suitable for use as a CSN is manufactured by Lucent Technologies. Although the system 10 illustrated in FIG. 1 shows a certain number of network elements (SCPs, CSNs, STPs, and SSPs), those of ordinary skill in the art understand that the presently preferred system and method may include more complex networks having a plurality of the interconnected network elements. Preferably, each CSN 26 is configured to communicate emergency call notices to numbers stored in the SCP database 21 and transmitted to the CSN 26 over the WAN 28 or other communication link. In one embodiment, the CSN 26 includes a caller ID generator 31 utilizing standard caller ID logic and containing a caller ID message to send to the contact telephones 36 associated with a particular subscriber number. In another embodiment, the CSN 26 contains a plurality of emergency notification message templates 33 stored in memory. Each of the templates 33 may have a general voice or text message for transmission to the contact telephones 36. Information regarding the particular emergency telephone call made by the subscriber is insertable into the appropriate message template. The CSN 26 is in communication with a second SSP 30 via data 32 and voice 34 lines. Although the CSN's 26 in FIG. 1 are connected to a different SSP than the subscriber 12, the CSN's may also be connected to the same SSP as the subscriber.

The system 10 further includes one or more contact telephones 36 connected to a third SSP 38. Each contact telephone is associated with a designated contact telephone number in the designated contact list 21 stored at the SCP 20. Again, although the contact telephones 36 are shown as communicating with an SSP separate from the SSPs connected to the subscriber and the CSN's, different configurations are contemplated wherein the subscriber telephone 12, contact telephones 36 and CSN's 26 are all connected to the same SSP or other combinations of SSPs. In order to implement the emergency telephone call notification service, the CSN preferably contains a port identity transfer control protocol/user defined protocol (TCP/UDP) address along with an internet protocol (IP) address identified by a socket. This virtual port (socket) number is identified and assigned on the CSN 26. Preferably, a CSN 26 is in communication with a SSP 30 over both data and voice lines utilizing ISDN-BRI connectivity. SS7 TCAP messaging is utilized between the SSP's and the SCP.

Referring now to FIG. 3, a preferred embodiment of the method of implementing an emergency telephone number notification service is described below with relation to the system show in FIG. 1. When a subscriber 12 goes off-hook (picks up the telephone receiver), the SSP 14 presents a dial tone to the subscriber and subscriber dials a telephone number (at steps 38, 40 and 42). The first SSP 14 receives these dialed digits and examines the dialed digits to see if they correspond with an AIN trigger. If the dialed digits are an emergency telephone number, such as 911, the SSP recognizes an N11 trigger and contacts the SCP 20 for instructions (at step 44). If no N11 trigger is recognized, the telephone call is processed and sent off to the designated destination. When an N11 trigger is encountered and the SSP 14 contacts the SCP 20, an info_analyze query is sent to the SCP 20 containing the calling party ID as well as standard SS7 call information (at step 26). The SCP 20 receives the info_analyze query and determines whether or not the calling party ID is associated with an emergency telephone notification service subscriber (at step 48). The SCP preferably performs this step by comparing the calling party ID with the information stored in the subscriber list 21 at the SCP 20.

If the calling party ID is not recognized by the SCP as a subscriber to the emergency telephone call notification service, the SCP sends an analyzed_route message back to the SSP and the SSP routes the call based on standard 911 routing data to the appropriate 911 operator at a PSAP 18 (at steps 50, 52). The analyzed_route message includes a called party ID, a calling party ID and a primary trunk group. If the SCP does recognize the calling party ID as a subscriber to the emergency telephone call notification service, the SCP 20 calls on enhanced 911 (E911) logic residing in memory at the SCP 20 and establishes a communication link, such as a TCP/IP link over the WAN 28, to a CSN 26 (at step 54). Preferably, the TCP/IP message sent by the SCP includes the subscriber's telephone number, a time when the subscriber called 911, a list of contact numbers associated with that subscriber number, and dialing instructions. In one alternative embodiment, the dialing instructions may already reside on the CSN and the SCP simply forwards the contact numbers and emergency telephone call information.

As soon as the CSN responds and confirms receipt of the instructions, the SCP returns a message to the first SSP 14 allowing the 911 call to terminate at the PSAP 18. Finally, the CSN 26, pursuant to the instructions received from the SCP 20, begins making telephone calls via the second SSP 30 to the designated contact numbers on the list (at step 56). As shown in FIG. 1, the contact telephones 36 are connected to a third SSP 38 that is in communication with the second SSP 30 over interoffice trunk lines 39. In other embodiments, the contact telephones 36 may be connected to any switch or may be connected to an intermediary communications device, such as a PBX, that is in communication with a switch.

As shown in FIG. 4, one preferred method of contacting telephone numbers listed on the contact list associated with a subscriber number is shown. The CSN 26 dials the first number on the contact list received from the SCP 20 (at step 58). In dialing each number, the CSN also transmits a caller ID message from the caller ID generator 31 indicating that the call is an emergency notification call. Preferably, the CSN invokes standard caller ID logic and uses a pseudo caller ID message such as "911 Notify" rather than the number of the 911 caller. If there is no answer at the first contact number, the CSN proceeds to dial the next contact number (at step 60) if there is an answer at any particular contact number, the CSN invokes answer verification logic which, in a preferred embodiment, consists of playing an announcement in response to detecting an answer (at step 62). Preferably, the announcement is a pre-recorded message assembled from the appropriate one of the message templates 33 stored at the CSN 26 stating that the call is a message from the 911 Notification Service. In one embodiment, the answer verification logic at the CSN may include a live answer detector where the answering party is requested to either press a key on the telephone pad or orally respond. In this way, the CSN can determine whether a person or answering device answers the call. The CSN then waits for a response and checks to see if there is a touch-tone or voice response (at step 64).

If the CSN 26 receives no response and an answering machine or voice mail system is detected then an announcement is played for recordal on the answering machine or voice mail and a timer in the answer verification logic at the CSN will keep track of the number of calls made to a given contact number and the time interval between each repeated call. In one embodiment, the CSN will place subsequent telephone calls to the contact number every five minutes (at steps 66, 68). The announcement left on the answering machine preferably includes information related to the subscriber telephone number and of time and day when the emergency telephone call was made from that number. Additionally, the message left on the answering machine or voice mail is preferably only left one time. Subsequent answers by answering machine or voice mail system will not trigger the announcement again. Additionally, if an answering machine or voice mail system is encountered after the first hour of attempting to place the emergency notification call, the CSN will continue placing calls at a greater interval of time for up to 24 hours after the original emergency telephone call was made by the subscriber. In one embodiment the interval of contacting the telephone number on the contact list would be increased to every 15 minutes. In another embodiment, the CSN may be instructed to leave an announcement every hour that the notification system is trying to reach the person at the number and repeating the information that an emergency call was placed from a particular number at a given time and day (at step 70).

If a response (touch tone or voice) is received from a person answering at the contact number dialed by the CSN, the CSN 26 may play an announcement indicating that the emergency call was placed from the subscriber telephone 12 at a particular time/day and will automatically attempt to connect the person answering the notification call to the subscriber telephone (at steps 72, 74). Additional messages indicating the system is attempting to connect the call may be played while the contact person is waiting on hold. If the subscriber telephone 12 from which the emergency telephone call was originally placed is busy, or no answer is received, the CSN 26 may simply play an announcement indicating that the line is busy and that the contact person should try later or may repeat the attempt to connect the contact person to the subscriber telephone number a predetermined number of times (at steps 76, 78). In another embodiment, the SCP may instruct the CSN to dial all of the contact numbers simultaneously to reach as many of the subscriber's chosen contact group as quickly as possible.

The system and method described above provides the advantage of an automated emergency telephone notification implemented on existing hardware such as AIN network elements. No additional hardware is required. Furthermore, in a preferred embodiment AIN communication protocols may be implemented to easily adapt and configure AIN network elements to allow for expeditious contact of designated parties while not interfering with the emergency telephone call placed by the subscriber. Preferably, the system and method described above may be used with emergency telephone call systems such standard 911, enhanced 911, or other custom emergency telephone call systems.

It is intended that the foregoing detailed description be regarded as illustrative rather than limiting, and that it be understood that the following claims, including all equivalents, are intended to define the scope of this invention.

We claim:

1. In a telecommunications system having at least one subscriber telephone in communication with an advanced intelligent network (AIN) capable switch, at least one intelligent peripheral (IP) in communication with the AIN capable switch, at least one service control point (SCP) in communication with the switch, and a public safety answering point (PSAP) in communication with the SCP and the switch, a method of notifying at least one designated telephone number that an emergency telephone call has been made from the subscriber telephone, the method comprising the steps of:
   recognizing an emergency telephone call at the switch;
   the switch informing the SCP of the emergency telephone call;
   the SCP instructing the IP to dial the at least one designated telephone number;
   the IP informing the at least one designated telephone number of the emergency telephone call from the subscriber telephone; and
   automatically placing a call from the at least one designated telephone number to the subscriber telephone if a person answers the at least one designated telephone number.

2. The method of claim 1, wherein the emergency telephone call is a 911 telephone call.

3. The method of claim 2, wherein the step of recognizing an emergency telephone call trigger further comprises recognizing an N11 trigger.

4. The method of claim 1, wherein the SCP further comprises a database having a list of subscriber telephones and a list of at least one designated telephone number associated with each of the subscriber telephones in the list of subscriber telephones, and wherein the step of the SCP instructing the IP to dial the at least one designated telephone number comprises the SCP retrieving a first of the at least one telephone number associated with the subscriber telephone number and instructing the IP to contact the first of the at least one telephone numbers that an emergency telephone call has been placed from the subscriber telephone.

5. The method of claim 1, wherein the SCP further comprises a database having a list of subscriber telephone numbers and a list of at least one designated telephone number associated with each of the subscriber telephone numbers, and wherein the step of the SCP instructing the IP to dial the at least one designated telephone number comprises the SCP retrieving all of the telephone numbers associated with the subscriber telephone number and instructing the IP to contact all of the designated telephone numbers simultaneously.

6. The method of claim 1, wherein the step of the IP informing the at least one designated telephone number further comprises the step of the IP supplying a caller ID message to the at least one designated telephone number indicating an incoming call from an emergency call notification service.

7. The method of claim 1, wherein the step of the IP informing at least one designated telephone number further comprises playing a prerecorded message if a person answers the emergency call notification call.

8. The method of claim 1, wherein the step of the IP informing the at least one designated number comprises the IP dialing a first of the at least one designated numbers and waiting a predetermined number of rings before trying to contact a next one of the at least one designated numbers.

9. An emergency call notification system comprising:
   a subscriber telephone;
   an AIN capable switch in communication with a public service access point (PSAP) and the subscriber telephone, the AIN switch configured to recognize an emergency telephone call;

a service control point (SCP) in communication with the switch, the SCP comprising a database having a list of emergency call notification service subscribers, the SCP configured to determine if an emergency telephone call was made by an emergency call notification service subscriber and correlate the emergency call notification service subscriber number with a list of at least one designated contact number for the emergency call notification service subscriber;

an intelligent peripheral (IP) in communication with the SCP, the IP responsive to an instruction from the SCP to contact the at least one designated contact number; and means for automatically connecting a designated contact number answered by a person to the emergency call notification service subscriber number.

10. The system of claim 9 further comprising a caller ID generator comprising a predesignated message stored in memory.

11. The system of claim 10 wherein the answer verification logic comprises a call repetition timer.

12. The system of claim 10 wherein the answer verification logic further comprises a live answer detector.

13. The system of claim 10 wherein the answer verification logic comprises a prerecorded message for transmission to an answering machine.

14. The system of claim 9 wherein the IP comprises answer verification logic.

15. The system of claim 9, wherein the IP is in communication with the SCP via a wide area network.

16. The method of claim 1, wherein the step of the SCP instructing the IP comprises sending a message via a wide area network connection to the IP.

17. The method of claim 16, wherein the message comprises a TCP/IP message.

18. The system of claim 9, wherein the IP further comprises a plurality of prerecorded message templates.

* * * * *